(12) United States Patent
Zurauskas

(10) Patent No.: US 12,372,348 B2
(45) Date of Patent: Jul. 29, 2025

(54) DYNAMIC PROFILOMETRIC IMAGING USING MULTISCALE PATTERNS

(71) Applicant: Meta Platforms Technologies, LLC, Menlo Park, CA (US)

(72) Inventor: Mantas Zurauskas, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 244 days.

(21) Appl. No.: 18/134,362

(22) Filed: Apr. 13, 2023

(65) Prior Publication Data
US 2024/0344823 A1   Oct. 17, 2024

(51) Int. Cl.
*G01B 11/25* (2006.01)
*H04N 13/254* (2018.01)

(52) U.S. Cl.
CPC ....... *G01B 11/2513* (2013.01); *H04N 13/254* (2018.05)

(58) Field of Classification Search
CPC . G01B 11/2513; G01B 11/25; G01B 11/2545; H04N 13/254
USPC ........................................................ 356/601
See application file for complete search history.

(56) References Cited

U.S. PATENT DOCUMENTS

| | | | |
|---|---|---|---|
| 10,007,994 B2 | 6/2018 | Grunnet-Jepsen et al. | |
| 10,425,597 B2 | 9/2019 | Lu et al. | |
| 11,146,767 B2 | 10/2021 | Sano | |
| 11,218,641 B2 | 1/2022 | Liu et al. | |
| 11,327,314 B2 | 5/2022 | Fabien et al. | |
| 2010/0183040 A1 | 7/2010 | Ishizu et al. | |
| 2017/0085790 A1 | 3/2017 | Bohn | |

FOREIGN PATENT DOCUMENTS

| | | | | |
|---|---|---|---|---|
| CN | 102859320 A | * | 1/2013 | ......... G01B 11/2513 |
| JP | 2014197403 A | * | 10/2014 | ............ B25J 11/009 |

OTHER PUBLICATIONS

Jeught S. V. D., et al., "Deep Neural Networks for Single Shot Structured Light Profilometry," Optics Express, Jun. 10, 2019, vol. 27, No. 12, pp. 17091-17101.

(Continued)

*Primary Examiner* — Tri T Ton
(74) *Attorney, Agent, or Firm* — Greenberg Traurig, LLP

(57) ABSTRACT

A system for dynamic profilometric imaging using multiscale pattern(s) is described. The system may include a projector that projects a multiscale pattern on an environment including a target of interest. The system may also include an imaging sensor that receives reflections of the projected multiscale pattern from the target of interest. The system may further include a controller of the camera and the projector which performs profilometric imaging of the target of interest by dynamically adjusting an operational parameter of the camera, the projector, and/or the controller. The multiscale pattern(s) may contain useful features at multiple scales and/or may be optimal at predetermined depths and/or resolutions. By dynamically adjusting the operational parameter, such a profilometric imaging system may perform there-dimensional (3D) scene reconstruction while maintaining optimal performance, power efficiency and profilometric resolution.

20 Claims, 9 Drawing Sheets

(56) References Cited

OTHER PUBLICATIONS

Miao H., et al., "Quality Assessment of Digital Speckle Patterns for the Single-Shot Speckle Projection Profilometry Based on a Visualised Simulation Platform," Optics and Lasers in Engineering, Jun. 2021, vol. 141, 11 pages.

Wikipedia, "Sierpinski Carpet," [online] [Retrieved on Apr. 12, 2023], 4 pages, Retrieved from the Internet: URL: https://en.wikipedia.org/wiki/Sierpi%C5%84skicarpet.

* cited by examiner

DYNAMIC PROFILOMETRIC IMAGING USING MULTISCALE PATTERNS

TECHNICAL FIELD

This patent application relates generally to profilometric imaging, and in particular, dynamic profilometric imaging of an object and/or environment using projected patterns with multiscale features.

BACKGROUND

With recent advances in technology, prevalence and proliferation of content creation and delivery has increased greatly in recent years. In particular, interactive content such as virtual reality (VR) content, augmented reality (AR) content, mixed reality (MR) content, and other content within and/or associated with a real and/or virtual environment (e.g., a "metaverse") have become more widely available to consumers. This interactive content includes simulated three-dimensional (3D) environments, objects, images, representations, art and the like.

To facilitate creation of three-dimensional (3D), simulated three-dimensional (3D), and other similar content, a wide variety of three-dimensional (3D) imaging systems, devices, and methods are being used and developed. When real world environments and/or objects are being captured, such techniques may be classified as passive, where one or more cameras passively record an environment/object without interacting with it (such as, e.g., stereo-vision in which two cameras are used to create three-dimensional (3D) data by triangulation), or active, where one or more cameras record an environment/object while it is actively illuminated by light or any type of radiation/signal capable of being recorded by the one or more imaging systems. In active three-dimensional (3D) imaging systems, the projected light/radiation may be modulated in time and/or space such that the details of the three-dimensional (3D) surfaces (i.e., the three-dimensional (3D) imaging data) may be calculated from the light/radiation reflected, received, and recorded by the one or more imaging systems.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

DETAILED DESCRIPTION

Figure 1:
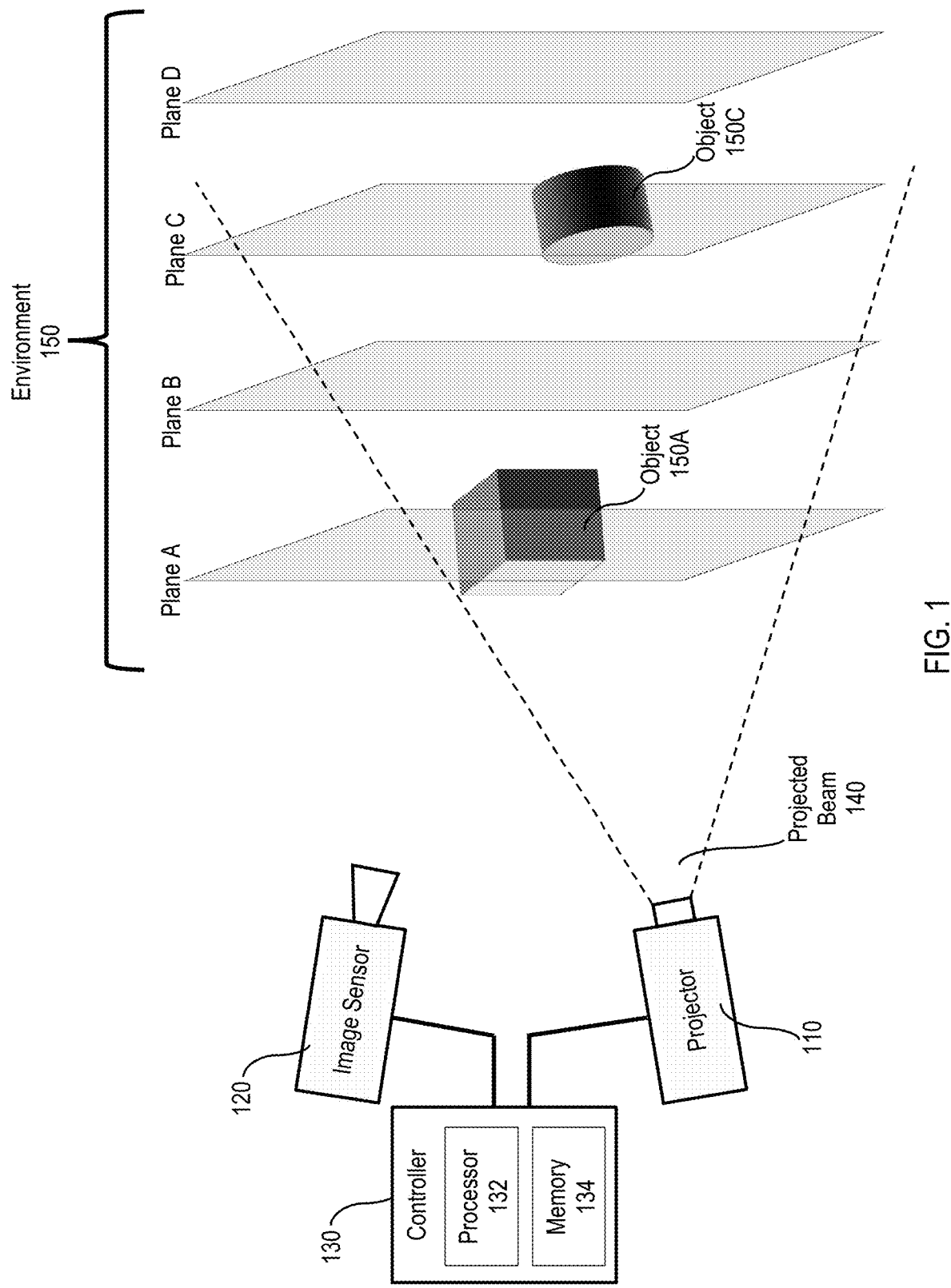
FIG. 1 illustrates a block diagram of a profilometric imaging system, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

As discussed above, camera-based depth mapping, contour sensing, three-dimensional (3D), and other profilometric approaches may be enhanced by projecting structured light on a target of interest, where that target of interest may be one or more objects or an entire (or partial) environment. As used herein, the term "profilometry" includes any technique to extract topographical data from three-dimensional (3D) surface, including, but not limited to, three-dimensional (3D) imaging, mapping, or sensing.

In structured light techniques, a projector actively illuminates a target with a known spatially-varying and/or time-varying pattern, and that projected pattern is distorted by the actual three-dimensional (3D) shape of the target, and a camera records the target as illuminated by the projected pattern (i.e., the distorted reflections of the projected pattern on the target). The three-dimensional (3D) shape, contour, or profile of the target may be extracted/determined, usually by a controller or any signal processing component, from the distortions of the projected pattern as reflected by the target and recorded by the camera.

In order to achieve the optimal profilometric resolution of an object of interest (i.e., a target), the parameters of the spatially-varying and/or time-varying pattern, as well as the parameters of the camera, may be optimized for the specific relative location of the target in relation to the projector and the camera. For example, when using a statistically random pattern (such as, e.g., a pattern of dots or a pattern of speckles), the density of the dots or speckles and resolution of the camera may be optimized for the specific distance of the target from the projector and the camera. If the pattern is too dense, its reflected image, as recorded by the camera, cannot be resolved and thus the required spatial information cannot be determined/extracted. If the pattern is too sparse, its reflected image, as recorded by the camera, may be missing fine, small details/features of the three-dimensional (3D) surface of the target, and thus the spatial information which may be determined/extracted from the reflected image may also be missing those fine details/features—i.e., the profile reconstruction may be sub-optimal.

According to examples of the present disclosure, systems, devices, and/or methods for multiscale pattern projection and detection are presented which allow for the dynamic adjustment of scene reconstruction resolution while preserving optimal performance and power efficiency at each resolution level. In some examples, systems, devices, and/or methods for multiscale pattern projection and detection are presented which optimize the profilometric imaging of a target of interest in an environment by dynamically adjusting at least one of a camera, a projector, and a controller in a profilometric imaging system. In some examples, systems, devices, and/or methods for multiscale pattern projection and detection are presented which project multiscale patterns that may contain useful features at multiple scales and may be optimal at pre-determined levels of camera resolution, pre-determined depths, and/or in accordance with other parameters of the target of interest and/or the environment.

FIG. 1 illustrates a block diagram of a profilometric imaging system using structured illumination, according to an example. As shown in FIG. 1, the profilometric imaging system according to an example may include a projector 110, an image sensor 120, and a controller 130.

In various examples, the projector 110, the image sensor 120, and the controller 130 may be combined into a single device (such as, e.g., a smartphone or a wearable display system) or further subdivided into multiple devices (for example, the projector 110 may consist of multiple projectors, the image sensor 120 may consist of multiple image sensors and/or cameras, and/or the functions of the controller 130 may be separated among various components, such as a digital signal processing (DSP) chip for image analysis as well as a Central Processing Unit (CPU) for controlling, e.g., the projector 110).

The controller 130 controls the projector 110 to project beam 140 onto an environment 150 consisting of an object 150A located in plane A and an object 150C located in plane C. The projected beam 140 comprises a multiscale pattern. As would be understood by one of ordinary skill in the art, the multiscale pattern in the projected beam 140 may be, for example, a statistically random pattern (such as, e.g., a pattern of dots or a pattern of speckles), an interference pattern (such as, e.g., a moire pattern or a fringe pattern), a sinusoidal pattern, a binary pattern, a multi-level pattern (such as, e.g., a multi-level grayscale pattern), a code-based pattern, a color-based pattern, and a geometrical pattern (such as, e.g., a triangular, pyramidal, or trapezoidal pattern).

In various examples of the present disclosure, the multiscale pattern in the projected beam 140 may, or may not, vary in time. For example, a single multiscale pattern may be employed (single-shot), or several different multiscale patterns at different times (multiple-shot), or several different multiscale patterns at the same time, or the multiscale pattern may vary continuously over time, and/or the like, as described in further detail below, and as would be understood by one of skill in the art.

In various examples of the present disclosure, the projector 110 may employ, as a light source, for example, at least one laser, a light emitting diode (LED), side-emitting laser diode, a vertical-cavity surface-emitting laser (VCSEL) diode, a superluminescent light-emitting diode (SLED), an array or multitude of any of the same, or the like, as would be understood by one of skill in the art. In some examples, the projector 110 may be an active or dynamic projector, which has both electronic and moving mechanical parts, such as the example described in reference to FIG. 5 below.

In various examples of the present disclosure, the projector 110 may employ, to create a multiscale pattern in the projected beam 140, e.g., interfering light source(s), diffractive optics, a mask, screen, or grating, mechanically moving parts such as mirrors or scanners, one or more light sources controlled by the controller 130 to generate specific patterns, and/or the like, as would be understood by one of skill in the art. In one example, the projector 110 may be a digital video projector and the controller 130 may use a digital image correlation (DIC) technique to perform the profilometric imaging/processing. In some examples, the projector 110 may use, to project beam 140, one or more of visible light, infrared light, ultraviolet light, or any form of radiation capable of forming multiscale patterns on a target object/environment such that the multiscale patterns may be seen and recorded by a camera in accordance with the present disclosure.

In various examples of the present disclosure, the image sensor 120 may be a digital camera which may use semiconductor imaging sensors and may or may not use optics and a variable aperture. In some examples, the optics, aperture, etc., may be effectively replaced by digital signal processing (DSP) of the data received by the semiconductor imaging sensors. In some examples, the image sensor 120 may be at least one of a charge-coupled device (CCD) or an active pixel sensor, also known as a complementary metal oxide semiconductor (CMOS) sensor. In other examples, the image sensor 120 may be other forms of metal oxide semiconductor (MOS) based sensors, such as, e.g., an n-type metal oxide semiconductor (nMOS) integrated circuit chip, or a modified metal oxide semiconductor (MOS) dynamic random access memory (RAM) chip.

In various examples of the present disclosure, the target of profilometry may be the entire environment 150, both objects 150A and 150B, or either of object 150A or 150B alone. As shown in FIG. 1, no objects of interest are in planes C or D. As explained in more detail in reference to FIGS. 2A-2B below, in various examples of the present disclosure, the profilometric imaging system may be inward-facing, such as an eye tracking system in a head-mounted display (HMD), or outward-facing, such as when a user of a smartphone takes a three-dimensional (3D) image of the user's environment.

The image sensor 120 may receive light reflected from the environment 150, create reflection data from the received light, and forward the reflection data to the controller 130, which may receive and use it to perform profilometry. In some examples, the controller 130 may include a processor 132 and a memory 134, which may be at least one non-transitory computer-readable storage medium storing instructions executable by the processors 132. The processor 132 may include multiple processing units, and those multiple processing units may further execute instructions in parallel. The at least one non-transitory computer-readable storage medium may be any memory, such as a hard disk drive, a removable memory, or a solid-state drive (e.g., flash memory or dynamic random access memory (DRAM)).

In various examples of the present disclosure, the controller 130 may perform structured light profilometry in accordance with the multiscale pattern used in the projected beam 140. Although a number of differing classification systems have been used and/or suggested, structured light profilometry may, very generally, be broken down into fringe projection profilometry (FPP), which may be understood to use periodic patterns, and non-fringe projection profilometry (non-FPP), which may be understood to use non-periodic patterns.

In non-fringe projection profilometry (non-FPP), random, semi-random, or pseudo-random patterns are projected on three-dimensional (3D) objects and/or environments, and the three-dimensional (3D) coordinates of the surface(s) of the target objects and/or environments can be determined by triangulation, based on the geometry of the optical setup, or based on a two-dimensional (2D) or three-dimensional (3D) mapping determined by camera calibration. Many non-fringe projection profilometry (non-FPP) techniques use lasers and/or scanning lasers to project random, semi-random, or pseudo-random patterns such as dots, stripes, grid pattern(s), and pseudo-random arrays or M-arrays. Statistically pseudo-random speckle patterns, often generated by one or more lasers, are widely used due to their uniqueness and high spatial distinguishability—the manner of processing, however, may depend on the manner of projection. For example, digital image correlation (DIC) may be used when the speckle pattern is produced by a digital video projector, while interferometry methods may be employed when interferometric techniques are used to project the speckle pattern.

In fringe projection profilometry (FPP), patterns defined by some sort of periodic pattern, whether in time, space, phase, intensity, etc., are used, including, for example, sinusoidal intensity patterns (which are used most commonly and are sometimes referred to as "fringe patterns"), binary patterns, triangular patterns, trapezoidal patterns, etc. Fringe projection profilometry (FPP) processing generally involves 4 steps: (1) projecting fringe patterns (usually sinusoidal) onto a target and capturing images of the fringe patterns as reflected by the target (which are phase modulated by the surface of the target); (2) retrieving the phase distribution with analysis techniques, such as phase shifting profilometry (PSP) and Fourier transform profilometry (FTP), most of which provide a wrapped phase distribution; (3) obtaining a continuous absolute phase distribution, or "unwrapped phase," by applying a phase unwrapping algorithm; and (4) converting the unwrapped phase into a height map, thereby achieving three-dimensional (3D) shape reconstruction.

In accordance with the present disclosure, examples may use fringe projection profilometry (FPP) and/or non-fringe projection profilometry (non-FPP) depending on the specific implementations, as shown and explained below, e.g., in reference to the examples shown in FIGS. 3-6, and as would be understood by one of ordinary skill in the art.

As described above in reference to FIG. 1, after the projector 110 projects the beam 140 bearing the multiscale pattern(s) into the environment 150, the image sensor 120 receives the reflection(s) of those projected multiscale pattern(s) from the environment 150 and passes that light data to the controller 130. In some examples, the controller 130 determines at least one operating parameter of the image sensor 120, the projector 110, and/or the controller 130 for profilometric imaging of a target based on the projected multiscale pattern and the received reflection(s) from the projected multiscale pattern, and then performs profilometric imaging of the target by dynamically adjusting the determined at least one operating parameter. In some examples, the at least one operating parameter of the image sensor 120, the projector 110, and/or the controller 130 may not be determined by the controller 130 during profilometry imaging, but rather may be determined and/or set before the profilometry imaging.

In some examples, the target may be the object 150A, but the image sensor 120 may provide the controller 130 with light data from all of the reflections of the multiscale pattern from all of the objects in the environment 150. In some examples, the controller 130 may determine at least one parameter of the image sensor 120, the projector 110, and/or the controller 130, and/or a value of the at least one operating parameter of the projector 110, the imaging sensor 120, and/or the controller 130, which is optimal for performing profilometry on the object 150A in plane A in an initial evaluation, and then may dynamically adjust the determined at least one operating parameter of the image sensor 120, the projector 110, and/or the controller 130 to perform profilometry on the object 150A in plane A in further imaging or as part of a continuous imaging process. What may be optimal depends on the characteristics of the profilometric imaging system, the features of the target of interest and/or the environment of the target of interest, etc., as would be understood by one of ordinary skill in the art, and as is discussed and described in further detail below with reference to certain non-limiting examples.

In some examples, the controller 130 may determine the at least one operating parameter for performing profilometry on the object 150A in plane A may be a quality, value, characteristic, and/or feature of imaging data, and then may dynamically adjust the determined quality, value, characteristic, and/or feature of the originally received imaging data set in order to remove extraneous unneeded data (such as, e.g., data concerning reflections from object 150C in plane C). In such examples, no more imaging need be performed, as the necessary changes may be made to the initial, originally received data set. In other examples, the at least one operating parameter of the projector 110, the imaging sensor 120, and/or the controller 130 and/or a value of the at least one operating parameter of the projector 110, the imaging sensor 120, and/or the controller 130 may be determined before the profilometric imaging is performed, i.e., pre-determined, as is described in further detail below in reference to certain non-limiting examples.

In some examples, the profilometric imaging system may use a plurality of multiscale patterns, where each individual multiscale pattern may be partially or completely unrelated to the other multiscale patterns, and/or the plurality of multiscale patterns may or may not have a sequence, series, or order. In some examples employing a plurality of multiscale patterns which may be related to each other, each individual multiscale pattern may be optimized for a specific depth (i.e., viewing distance or distance from the profilometric imaging system to a plane of a target of interest), a certain type of ambient lighting and/or any other specific environmental feature(s), a specific sort of target object, and/or a specific feature(s) of the surface of the target object, etc., as would be understood by one of ordinary skill in the art. In such examples, the profilometric imaging system may determine which of the pre-optimized multiscale patterns is most suitable for three-dimensional (3D) imaging of the target of interest and then dynamically adjust the projector 110, the imaging sensor 120, and/or the controller 130 such that the determined pre-optimized multiscale pattern is projected, sensed, and/or isolated in the imaging data set.

In such a manner, systems, devices, and/or methods according to examples of the present disclosure may dynamically adjust scene reconstruction resolution while also preserving optimal performance and power efficiency at each resolution level. In some examples, the profilometric imaging system may maintain optimal profilometric resolution even when camera settings are changed (through, for example, binning or sparse imaging), allowing dynamic increases in profilometric sensing speed or changes in power consumption. Other examples in accordance with the present disclosure are described further below in reference to FIGS. 3-6.

As discussed above, in structured light profilometric imaging systems, spatially-varying and/or time-varying light/radiation may be projected as a pattern on the target object/environment and the light reflected from the pattern projected on the target object/environment may be used by the profilometric imaging system to image, map, and/or sense the target's three-dimensional (3D) surface(s). Such structured light profilometric imaging systems are commonly used in consumer electronics, both inwardly (i.e., towards the user) and outwardly (i.e., towards the environment or one or more objects of interest in the environment). As an outward example, a smartphone may project a statistically random dot pattern or a laser speckle pattern on the local environment in order to perform three-dimensional (3D) imaging of the environment or an object in that environment. As an inward example, a wearable eye device capable of displaying interactive content to its user may use a system, device, and/or method to project, e.g., a statistically random dot or speckle pattern, on the user's eye(s) in order to track, e.g., the pupil's location, and thus determine the direction of the user's gaze.

One example of a wearable device capable of both inward-facing and outward-facing profilometric imaging may be a head-mounted display (HMD) device, such as a wearable eyewear, a wearable headset, or a near-eye display device in the form of a pair of glasses. In some examples, the head-mounted display (HMD) device may project or direct light to display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment. Head-mounted display (HMD) devices may also present interactive content, where a user's (wearer's) gaze may be used as input for the interactive content.

Figure 2A:
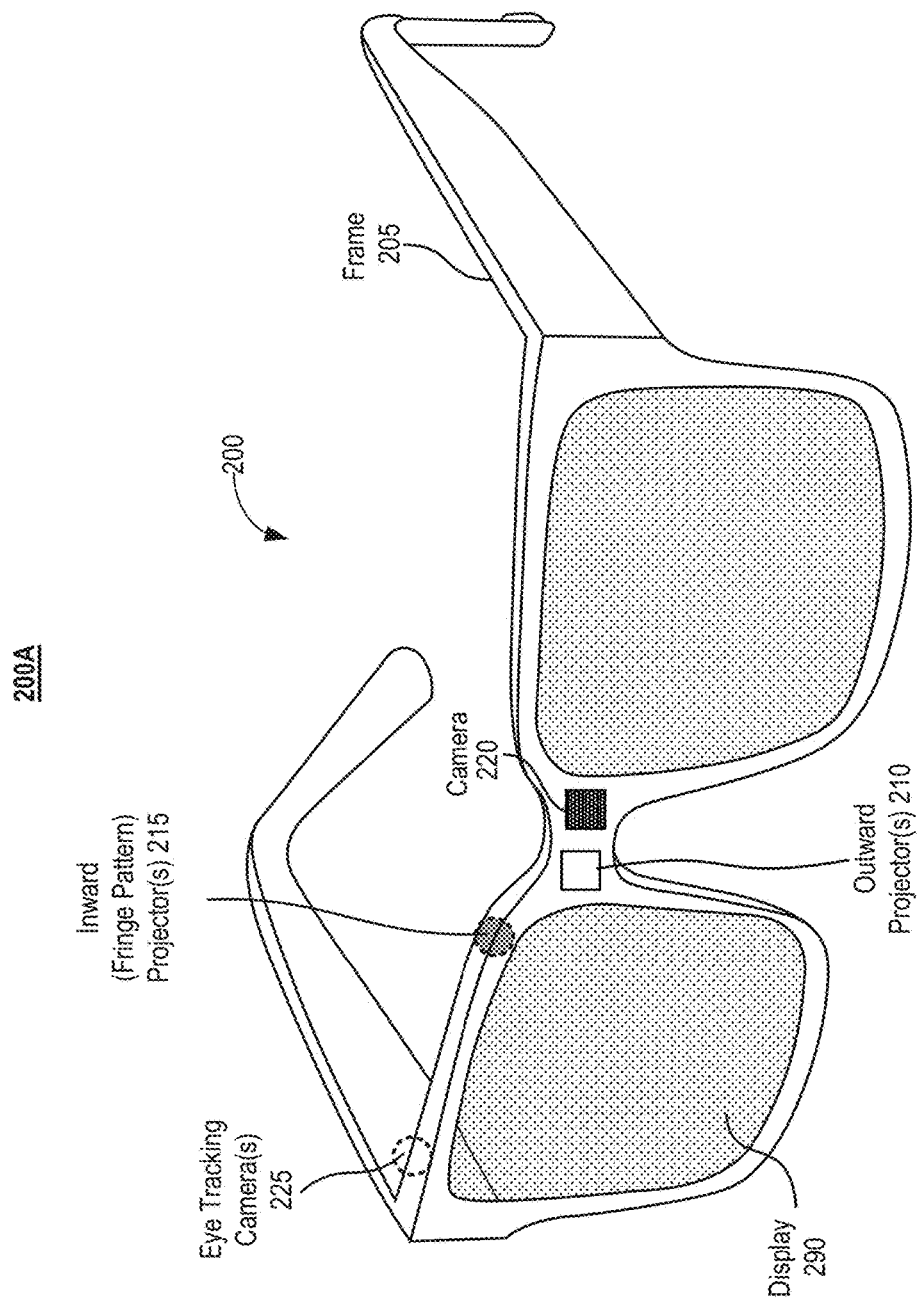
FIGS. 2A and 2B illustrate a perspective view and a top view of a near-eye display device in the form of a pair of glasses which may be used as both an inward-facing and an outward-facing profilometric imaging system, according to an example.
Figure 2B:
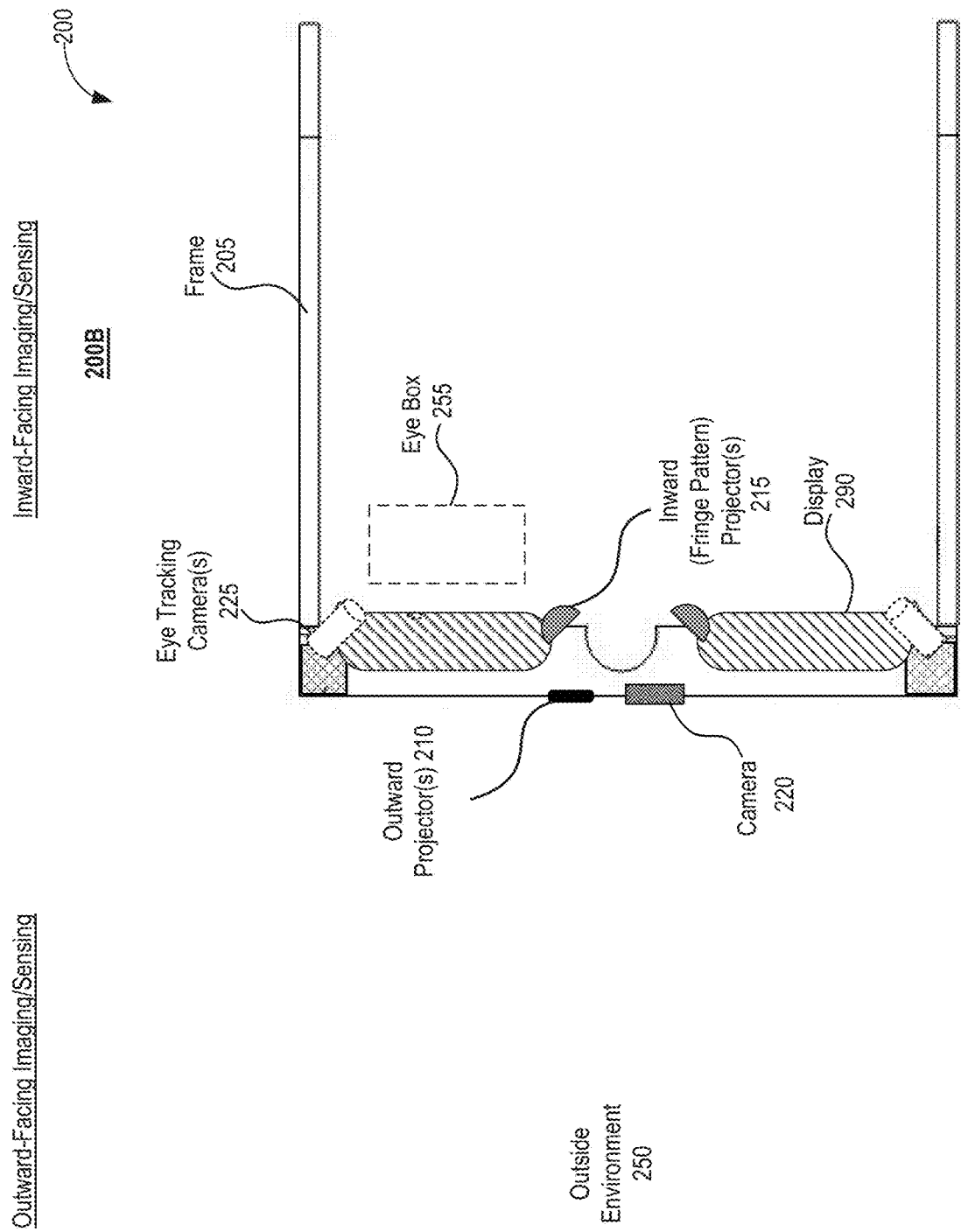

FIGS. 2A and 2B illustrate a perspective view and a top view of a near-eye display device in the form of a pair of glasses which may be used as both an inward-facing and an outward-facing profilometric imaging system, according to an example.

FIG. 2A is a perspective view 200A of a near-eye display device 200 in the form of a pair of glasses (or other similar eyewear) which may be used in accordance with the present disclosure, according to an example. In some examples, the near-eye display device 200 may be configured to operate as a virtual reality display, an augmented reality (AR) display, and/or a mixed reality (MR) display.

In some examples, the near-eye display device 200 may include a frame 205 and a display 290. In some examples, the display 290 may present media or other content to a user. In some examples, the display 290 may include display electronics and/or display optics, such as, for example, a liquid crystal display (LCD) display panel, a light-emitting diode (LED) display panel, or an optical display panel (e.g., a waveguide display assembly). In some examples, the display 290 may also include any number of optical components, such as waveguides, gratings, lenses, mirrors, etc.

In some examples, the near-eye display device 200 may further include an outward projector(s) 210 to project light into a physical environment, or outward environment. The projected light may be associated with different frequency bands (e.g., visible light, infra-red light, ultra-violet light, etc.), and may serve various purposes. In some examples, the outward projector(s) 210 may be used as described above with respect to the projector 110 in FIG. 1.

In some examples, the near-eye display device 200 may include a camera 220 or other image capture unit facing outward from the user. The camera 220 may capture images of the physical environment in the field of view. In some instances, the captured images may be processed, for example, by a virtual reality engine to add virtual objects to the captured images or modify physical objects in the captured images, and the processed images may be displayed to the user by the display 290 for augmented reality (AR) and/or mixed reality (MR) applications. In some examples, an outward-facing profilometric imaging system in accordance with the examples of the present disclosure may be implemented in near-eye display device 200 by using the outward-facing camera 220 and the outward projector(s) 210 in a similar manner as the image sensor 120 and the projector 110 in FIG. 1.

The near-eye display device 200 in FIGS. 2A-2B may also include an inward-facing profilometric imaging system implemented in accordance with the examples of the present disclosure in the form of an eye tracking system. As used herein, "eye tracking" may refer to determining an eye's position or relative position, including orientation, location, and/or gaze of a user's eye. In some examples, the eye tracking system may include an eye tracking camera 225 that captures one or more images of an eye and an inward (fringe pattern) projector 215 that may be directed to the eye such that light reflected by the eye may be captured by the eye tracking camera 225. In some examples, the eye tracking camera 225 may be a single photon avalanche diode (SPAD) sensor. In some examples, the structured image (e.g., fringe pattern) may be projected onto the eye by a micro-electro-mechanical system (MEMS) based scanner reflecting light from a light source (e.g., a laser). In other examples, an eye tracking unit may capture reflected radio waves emitted by a miniature radar unit. These data associated with the eye may be used to determine or predict eye position, orientation, movement, location, and/or gaze.

FIG. 2B is a top view 200B of the near-eye display device 200, according to an example. In some examples, the frame 205 supports, for each eye: the inward (fringe pattern) projector(s) 215, the display 290 to present content to a user's eye located in an eye box 255, and the eye tracking camera 225. Thus, as shown in FIG. 2B, an inward-facing profilometric imaging system in accordance with the examples of the present disclosure may be implemented in the form of the eye tracking system in the near-eyer display device 200, where the eye tracking camera 225 and the inward (fringe pattern) projector(s) 215 are used in a similar manner as the image sensor 120 and the projector 110 in FIG. 1, and the target of interest may be the eye in the eye box 255. FIG. 2B also shows the outward-facing profilometric imaging system using the outward-facing camera 220 and outward projector(s) 210, where the target of interest may be the outside environment 250, or one or more objects in the outside environment 250.

In some examples, the outward-facing three-dimensional (3D) image processing and the inward-facing eye position/orientation determination functions may be performed by a central controller, not shown, of the near-eye display 200. The central controller may also provide control signals to the display 290 to generate the images to be displayed to the user, depending on the determined eye positions, eye orientations, gaze directions, eyes vergence, etc.

Figure 3:
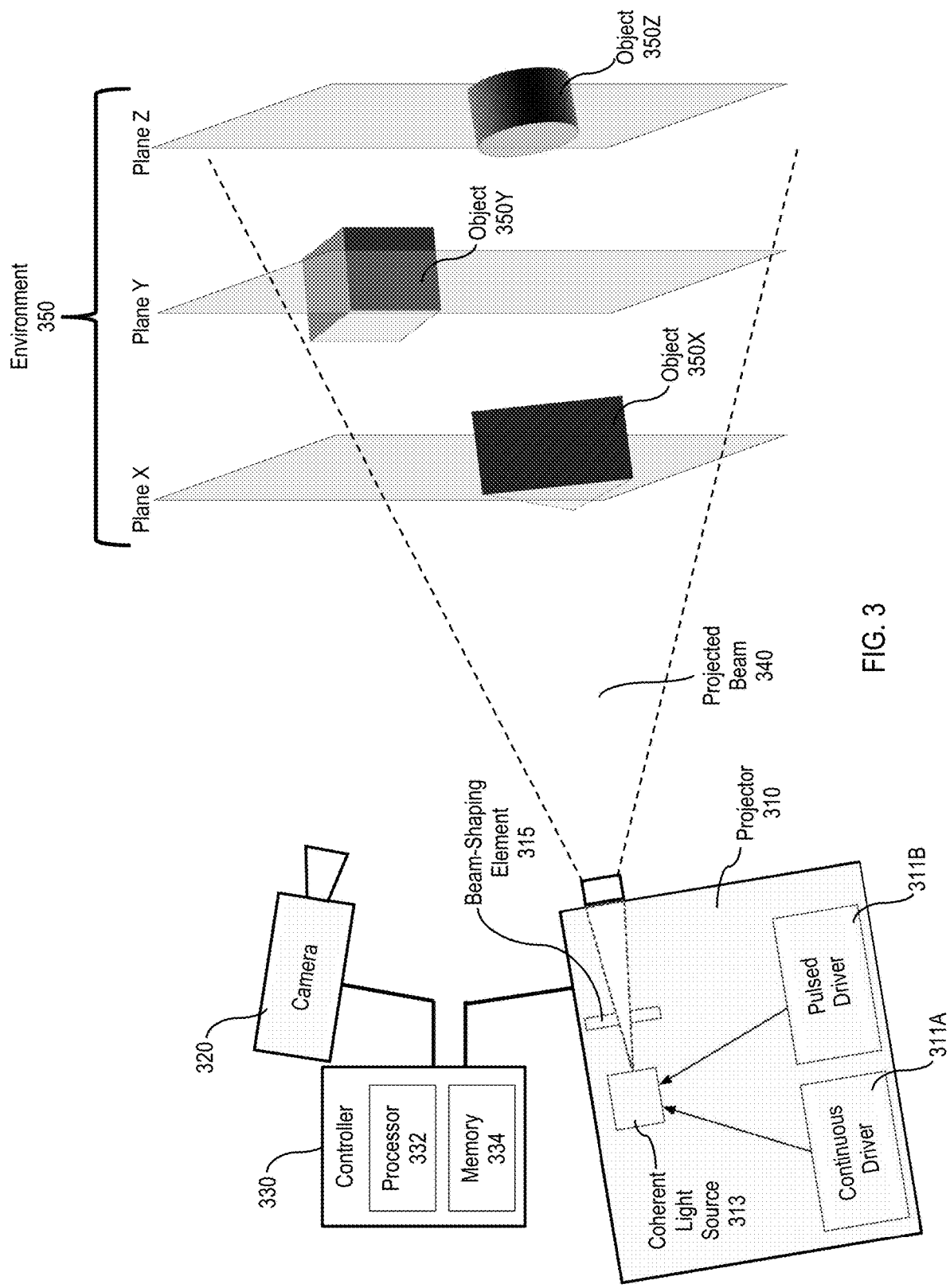
FIG. 3 illustrates a block diagram of a profilometric imaging system using a projector capable of a continuous and a pulsed mode, according to an example.

FIG. 3 illustrates a block diagram of a profilometric imaging system using a projector capable of a continuous and a pulsed mode, according to an example. As shown in FIG. 3, the profilometric imaging system may include a projector 310, a camera 320, and a controller 330. In a similar manner as FIG. 1, the controller 330 in FIG. 3 controls the projector 310 to project a beam 340, which carries the multiscale pattern(s), onto an environment 350; the camera 320 receives reflection(s) of the projected multiscale pattern(s) from the environment 350; and the controller 330 receives and processes light data from the camera 320 in order to perform profilometry. In FIG. 3, the environment 350 consists of an object 350X located in a plane X, an object 350Y located in a plane Y, and an object 350Z located in a plane Z.

As shown in FIG. 3, the projector 310 may be a coherent light source 313, which may be driven by a continuous driver 311A and a pulsed driver 311B, producing light which may be further shaped by a beam shaping element 315 to form the projected beam 340. In some examples, when driven by the continuous driver 311A, the coherent light source 313 continuously projects the beam 340 with a multiscale pattern defined by the beam shaping element 315. When driven by the pulsed driver 311B, the coherent light source 313 projects the beam 340 with a multiscale pattern defined by both the pulsed light produced by the coherent light source 313 and the beam shaping element 315. In some examples, the pulses may be in the nanosecond range, while the camera shutter speed (i.e., time spent forming an individual image) may be in the microsecond or millisecond range. Because of this, the pulses shape/define the multiscale pattern as reflected by the environment 350 and received or "seen" by the camera 320. By varying the timing of the pulses generated by the pulsed driver 311B, different patterns may be projected, reflected, and imaged by the camera 320.

In some examples, a finely detailed speckle pattern may be produced when the coherent light source 313 may be continuously driven by the continuous driver 311A. When driven by the pulsed driver 311B, the details/resolution of the speckle pattern may be changed based on the timing of the pulses, i.e., from fine to coarse. In some examples, the controller 330 may vary one or more pulse parameters, such as, e.g., timing, intensity, etc., to determine the optimal multiscale pattern for the best resolution of the target of interest. In some examples, the controller 330 may determine and select a pulse timing parameter such that, for instance, the fine details of the three-dimensional (3D) surface of the object 350Y in plane Y may be optimally recorded and processed to perform profilometric imaging of the object 350Y in plane Y.

In some examples, a two-level or multiscale structure may be created through the use of laser speckle generated by the coherent light source 313 driven by a continuous driver 311A and a pulsed driver 311B and a fringe pattern otherwise generated by the profilometry system, such as, e.g., by beam-shaping element 315. In such an example, both a fringe pattern and a speckle pattern may form the projected beam 340 on the environment 350, thereby creating a high density illumination pattern which may result in much more three-dimensional (3D) contour information. In some examples, the density of the multiscale pattern may be varied by changing the operational parameters of the speckle pattern. In such examples, the speckle pattern may be tuned through controlling the coherence properties of the coherent light source 313 by, for example, varying the intensity and/or timing of the pulsed driver 311B. In such examples, the speckle pattern structure (coarse vs. fine) may be defined by changing the spectral width of the beam 340 projected by the coherent light source 313 through, for example, changing the adjustable pulsing parameters (such as, e.g., timing/frequency, intensity, length of pulse, length of gap between pulses, chirping, etc.).

In general, speckle patterns for profilometry are limited in accuracy and resolution by noise, i.e., the ambient light sources in the local environment. In examples in accordance with the present disclosure, such limitations may be overcome by the dynamic adjustment of parameters, such as, in the example in FIG. 3, the parameters of the continuous driver 311A and the pulsed driver 311B.

As would be understood by one of skill in the art, the beam shaping element 315 may be used to create a wide variety of patterns besides a speckle pattern, and changing the timing of the pulsed driver 311B would similarly change the resolution and/or other details of any such projected pattern such that a multitude of patterns may be projected, thereby enabling the dynamic adjustment of three-dimensional (3D) reconstruction parameters, such as resolution, while preserving optimal performance and power efficiency at each resolution level.

In some examples, the coherent light source 313 may be a single light or laser diode, an array of light/laser diodes, or a multitude of light/laser diodes in a specific and/or dynamic spatial relationship with each other. In some examples, the coherent light source 313 may be a Vertical Cavity Surface Emitting Laser (VCSEL) or an array/multitude of Vertical Cavity Surface Emitting Lasers (VCSELs). In some examples, the Vertical Cavity Surface Emitting Laser (VCSEL) or array/multitude of Vertical Cavity Surface Emitting Lasers (VCSELs) may be part of a semiconductor chip. In some examples, the drivers 311 may be combined into a single driver or an even more multifunctional component, or further separated into more components, such as a driver for each timing pattern and/or intensity pattern.

In some examples, the beam forming element 315 may be a mask, a screen, diffractive optics or grating, and/or the like, as would be understood by one of skill in the art. In some examples, the beam shaping element 315 may also be positioned in front of the camera. In some examples, the beam shaping element 315 may separate the projected beam 340 into multiple beams for illuminating the environment/object, where the multiple beams may or may not have identical features/details/resolution. In some examples, the beam shaping element 315 may consist of multiple beam forming elements, which may or may not be identical or similar in construction and/or function.

The operational parameter to be dynamically adjusted in examples in accordance with the present disclosure may be at least one parameter or setting of the controller 330, the camera 320, or the projector 310. For instance, using the examples detailed above, the operational parameter may be, e.g., any adjustable pulsing parameters, such as timing or intensity, etc., as would be understood by one of ordinary skill in the art.

Figure 4A:
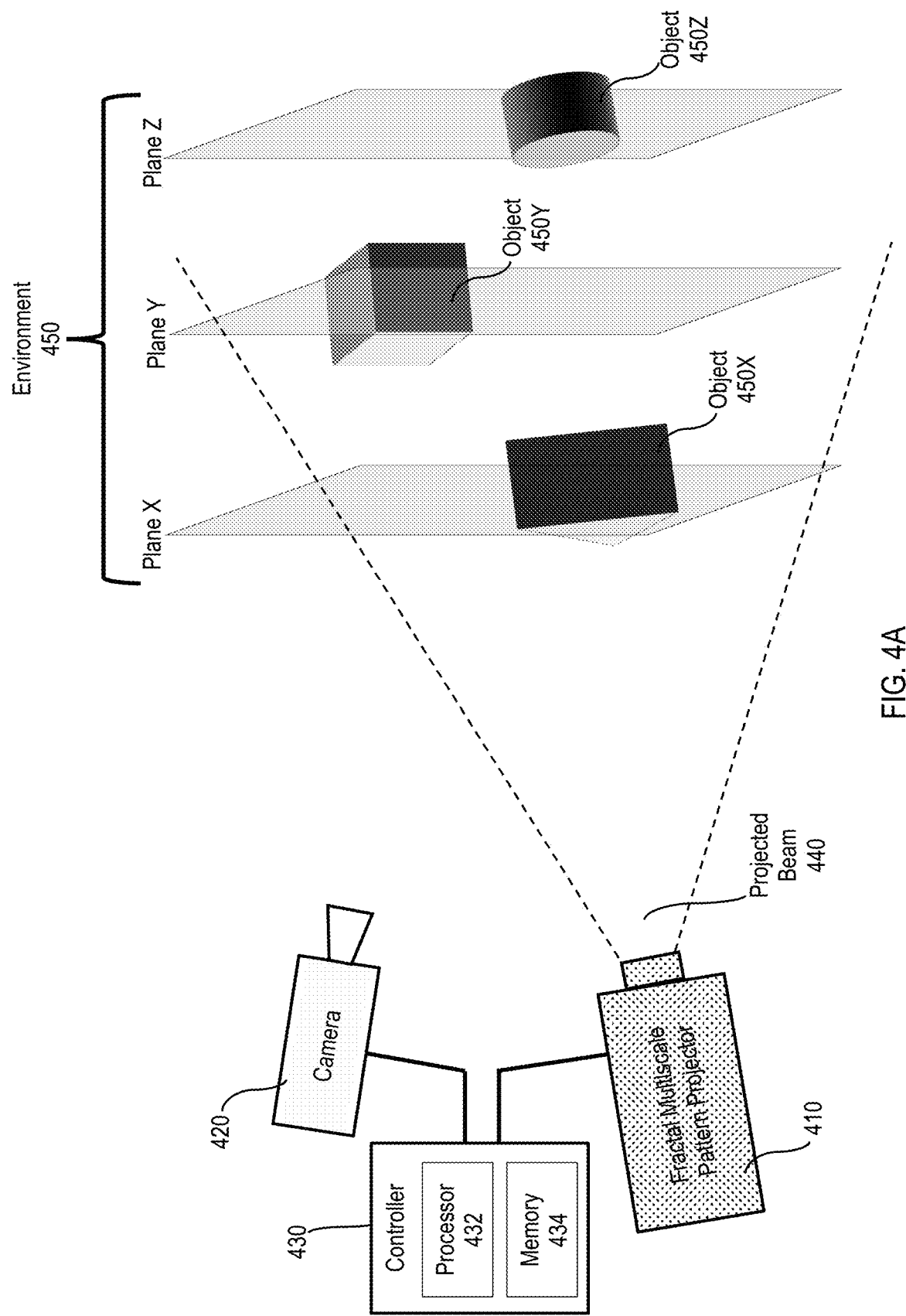
FIG. 4A illustrates a block diagram of a profilometric imaging system using a fractal multiscale pattern projector, according to an example.

FIG. 4A illustrates a block diagram of a profilometric imaging system using a fractal multiscale pattern projector, according to an example. As shown in FIG. 4A, the profilometric imaging system according to an example may include a fractal multiscale pattern projector 410, a camera 420, and a controller 430. In a similar manner as FIGS. 1 and 3, the controller 430 in FIG. 4A controls the fractal multiscale pattern projector 410 to project beam 440, which carries a fractal or fractal-like multiscale pattern(s), onto an environment 450; the camera 420 receives reflection(s) of the projected fractal or fractal-like multiscale pattern(s) from the environment 450; and the controller 430 receives and processes light data from the camera 420 in order to perform profilometry. In a similar manner as FIG. 3, the environment 450 in FIG. 4A consists of an object 450X located in plane X, an object 450Y located in plane Y, and object 450Z located in plane Z. A key characteristic that defines a "fractal-like" pattern is that it is resolvable and provides sufficient sampling of an optical transfer function of the detection system when observed with detectors operating at different spatial resolution scales.

In some examples, the fractal multiscale pattern projector 410 may project the fractal or fractal-like multiscale pattern(s) through a shadow mask or interferometric beam element. In some examples, the fractal multiscale pattern projector 410 may comprise a multitude or array of individual projectors in order to project the fractal or fractal-like multiscale pattern(s). In some examples, after creating an imaging data set by imaging the environment 450 at full resolution in an initial evaluation, the controller 430 may select a binning (or sparse sampling) factor to apply to the imaging data set in order to reduce the amount of data which must be captured and/or processed to complete the three-dimensional (3D) reconstruction.

In some examples, the fractal or fractal-like multiscale pattern projected by the fractal multiscale pattern projector 410 may be a single fractal or fractal-like pattern, while in other examples, the fractal or fractal-like multiscale pattern may be a plurality/multitude of fractal or fractal-like multiscale patterns. In some examples employing a plurality/multitude of fractal or fractal-like multiscale patterns, the fractal or fractal-like multiscale patterns may be partially or completely unrelated to each other, and/or have no sequence, series, or order. In some examples employing a plurality/multitude of fractal or fractal-like multiscale patterns, the fractal or fractal-like multiscale patterns are related to each other, and may have a sequence, series, or order, such as the series of fractal multiscale patterns comprising the Sierpiński carpet shown in FIG. 4B and described in more detail below. In some examples employing a plurality/series of fractal or fractal-like multiscale patterns, each fractal or fractal-like multiscale pattern in the series may be optimized for a specific depth (i.e., viewing distance or distance from the profilometric imaging system to a plane of a target of interest), ambient lighting, the nature of the target and/or the nature of the surface of the target object, etc.

Figure 4B:
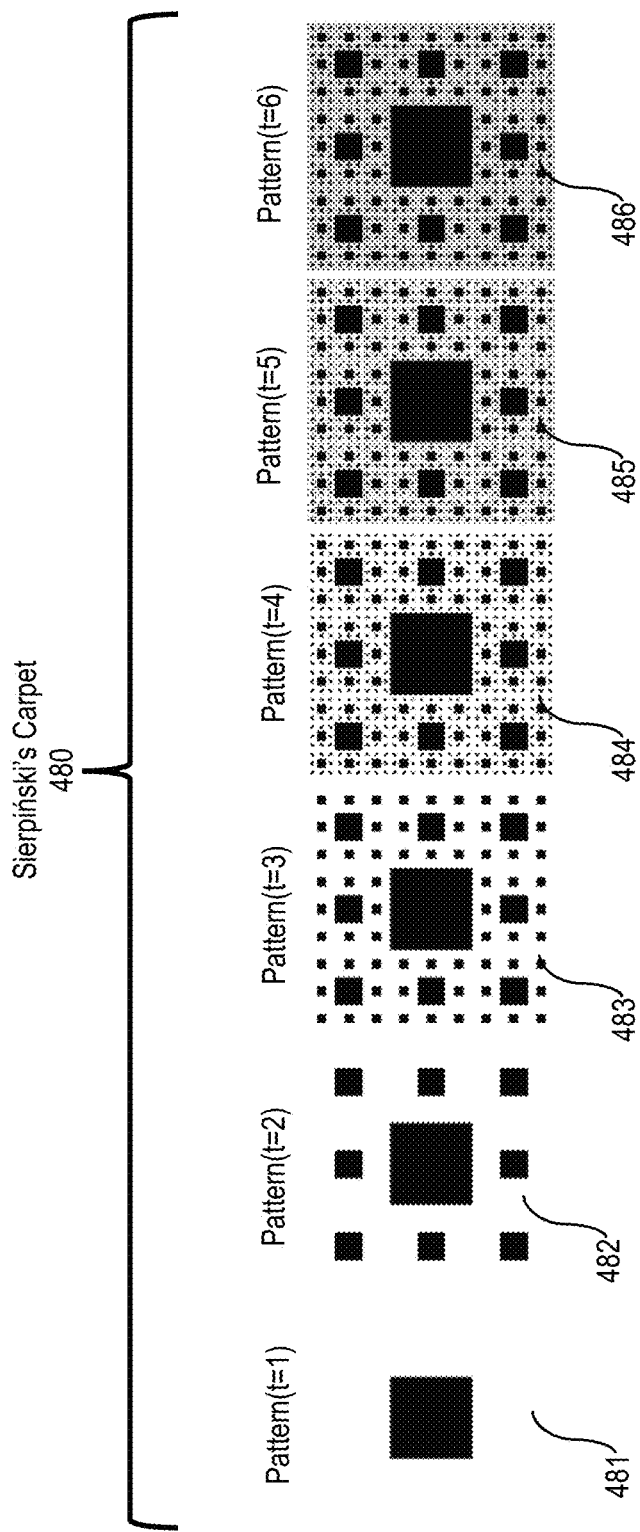
FIG. 4B illustrates a series of patterns forming a Sierpiński carpet which may be used as a fractal multiscale pattern series in the profilometric system of FIG. 4A, according to an example.

FIG. 4B illustrates a series of patterns forming a Sierpiński carpet which may be used as a fractal multiscale pattern series in the profilometric imaging system of FIG. 4A, according to an example. As shown in FIG. 4B, the Sierpiński carpet 480 is a plane fractal pattern series, where each pattern in the series is generated from the last, by applying the same recursive algorithm. More specifically, the series starts with a square subdivided into 9 congruent subsquares in a 3-by-3 grid, where the central subsquare is removed from the 3-by-3 grid (pattern 481 in FIG. 4B). Next, each subsquare is divided into 9 congruent sub-subsquares, each of which has its central sub-subsquare removed (pattern 482 in FIG. 4B). This method of removal continues recursively, as shown by patterns 482-486 in FIG. 4B.

In an example of the profilometric imaging system of FIG. 4A projecting a Sierpinski carpet series, such as shown in FIG. 4B, the fractal multiscale pattern projector 410 may project each pattern in a time series, where pattern 481 would be projected at t=1, pattern 482 would be projected at t=2, pattern 483 would be projected at t=3, and so on. In such an example, different patterns may be optimal at different distances. For instance, object 450X may be best resolved for three-dimensional (3D) reconstruction when pattern 483 may be projected upon it, while object 450Z may be best resolved for three-dimensional (3D) reconstruction when pattern 486 may be projected upon it.

In some examples, after creating an imaging data set by imaging the environment 450 at full resolution with a complete fractal series of patterns, the controller 430 may select a binning (or sparse sampling) factor to apply to the imaging data set in order to reduce the amount of data which must be captured and/or processed to complete the three-dimensional (3D) reconstruction.

The operational parameter to be dynamically adjusted in examples in accordance with the present disclosure may be at least one parameter or setting of the controller 430, the camera 420, or the fractal multiscale pattern projector 410. For instance, using the examples detailed above, the operational parameter may be, e.g., a parameter or setting of the binning factor or spare sampling factor, any other factor for narrowing down the imaging data set to focus on the target of interest, and/or any other factor for attenuating the reflection(s) and/or reflection data outside the plane of the target of interest, etc., as would be understood by one of ordinary skill in the art.

Figure 5:
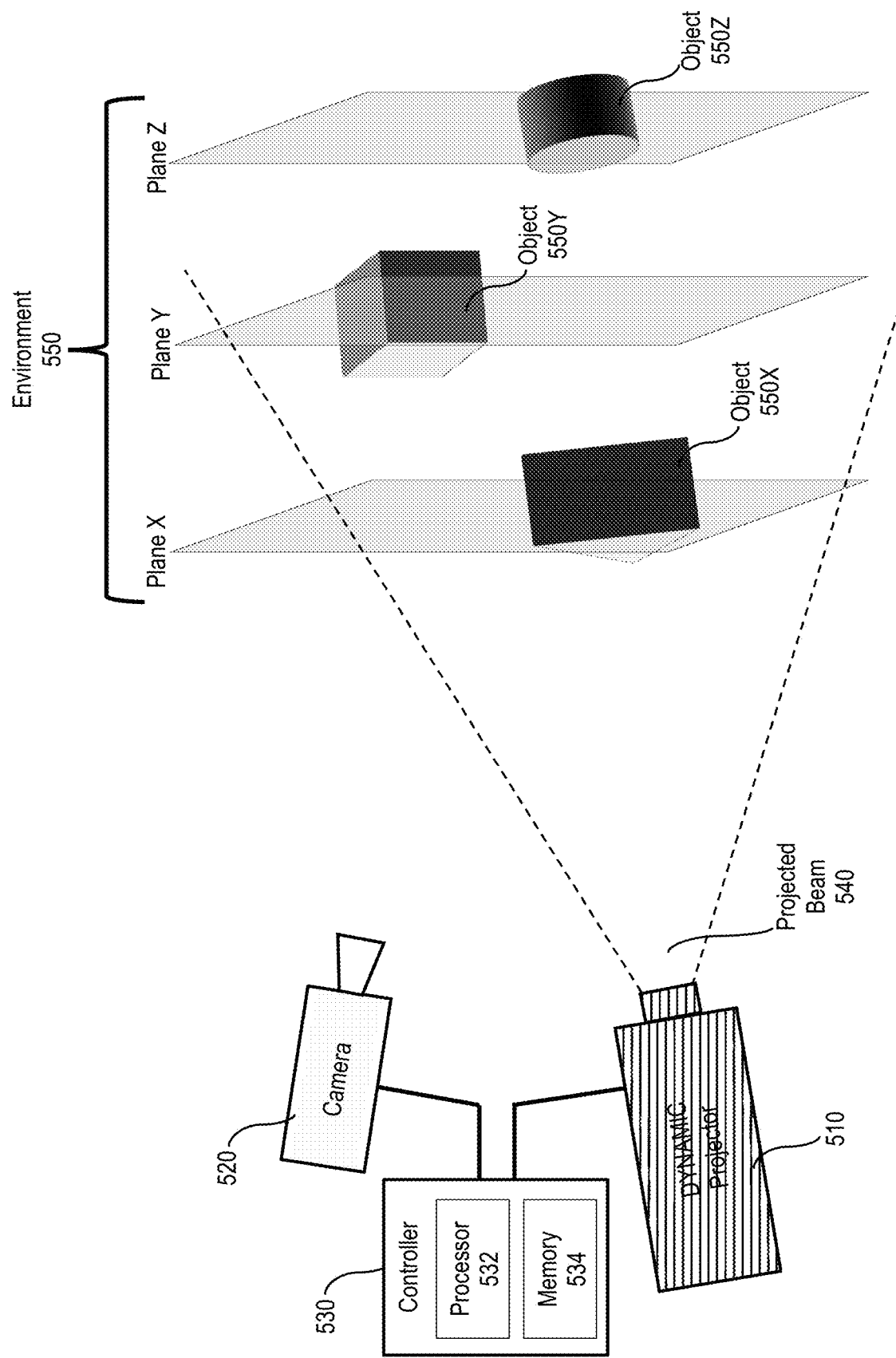
FIG. 5 illustrates a block diagram of a profilometric imaging system using a dynamic projector, according to an example.

FIG. 5 illustrates a block diagram of a profilometric imaging system using a dynamic projector, according to an example. As shown in FIG. 5, the profilometric imaging system according to an example may include a dynamic projector 510, a camera 520, and a controller 530. In a similar manner as FIGS. 1, 3, and 4A, the controller 530 in FIG. 5 controls the dynamic projector 510 to project beam 540, which carries multiscale pattern(s), onto an environment 550; the camera 520 receives reflection(s) of the projected multiscale pattern(s) from environment 550; and the controller 530 receives and processes light data from the camera 520 in order to perform profilometry. In a similar manner as FIGS. 3 and 4A, the environment 550 in FIG. 5 consists of an object 550X located in plane X, an object 550Y located in plane Y, and an object 550Z located in plane Z.

In some examples, the dynamic projector 510 may be a device having both electronic and moving or mechanical parts, such as a point scanning or active projector, which may have, for example, an element for dynamic illumination field shaping. Thus, an example characteristic of a dynamic projector may be that it can be used to project more than one pre-set or dynamically computed pattern, which may be selected by controlling either optical components, mechanical components, electronic components, or a combination thereof. In some examples, the dynamic projector 510 may be a scanning projector such as, for example, a micro-electromechanical system (MEMS) reflecting light from a light source (e.g., a laser) or a micro-optoelectronic system (MOEMS), such as a digital micro mirror device. In some examples, the element for dynamic illumination field shaping used in the dynamic projector 510 may be, for example, a spatial light modulator (such as, e.g., an electrically-addressed spatial light modulator (EASLM) or an optically-addressed spatial light modulator (OASLM)), a deformable mirror or an array of deformable mirrors, a galvanometric scanner or modulator, or an acousto-optic scanner or modulator (such as, e.g., a Bragg cell or acousto-optic deflector (AOD). In some examples, the dynamic projector may be an interferometric modulator display (IMOD), in which an electrically switched light modulator comprising a microscopic cavity that is switched on and off using thousands of micro-electromechanical system (MEMS) elements. In some examples, parameters and settings for the dynamic projector 510 are dynamically adjusted for optimal resolution at the plane where the target of interest may be located.

In examples using miniature mechanical mirrors on a semiconductor chip which reflect a light source (e.g., a laser), such as, e.g., a micro-electromechanical system (MEMS) or a micro-optoelectronic system (MOEMS), the controller 530 may control the dynamic projector 510 to generate a bias voltage which may be used to drive the mirrors, either individually or in groups, etc., to mechanically vary their positioning, such as, for example, between an ON and on OFF position, thereby corresponding to a pixel being white or black, respectively. More generally speaking, in such examples, the mirrors may be driven to mechanically vary their positions by, e.g., using electromagnetic, electrostatic, thermoelectric, and/or piezoelectric effects/actuators. In examples using acousto-optic scanners/modulators, the controller 530 may control the dynamic projector 510 such that piezoelectric transducer(s) in the dynamic projector 510 vibrate glass optics to thereby cause periodic modulation and/or interference in the projected beam 540.

The operational parameter to be dynamically adjusted in examples in accordance with the present disclosure may be at least one parameter or setting of the dynamic projector 510. For instance, using the examples detailed above, the operational parameter may be, e.g., a parameter or setting of the mechanical actuators connected to mirrors in a micro-electromechanical system (MEMS) or a micro-optoelectronic system (MOEMS), a parameter or setting of a piezoelectric transducer(s) in an acousto-optic scanner/modulator, etc., as would be understood by one of ordinary skill in the art.

Figure 6:
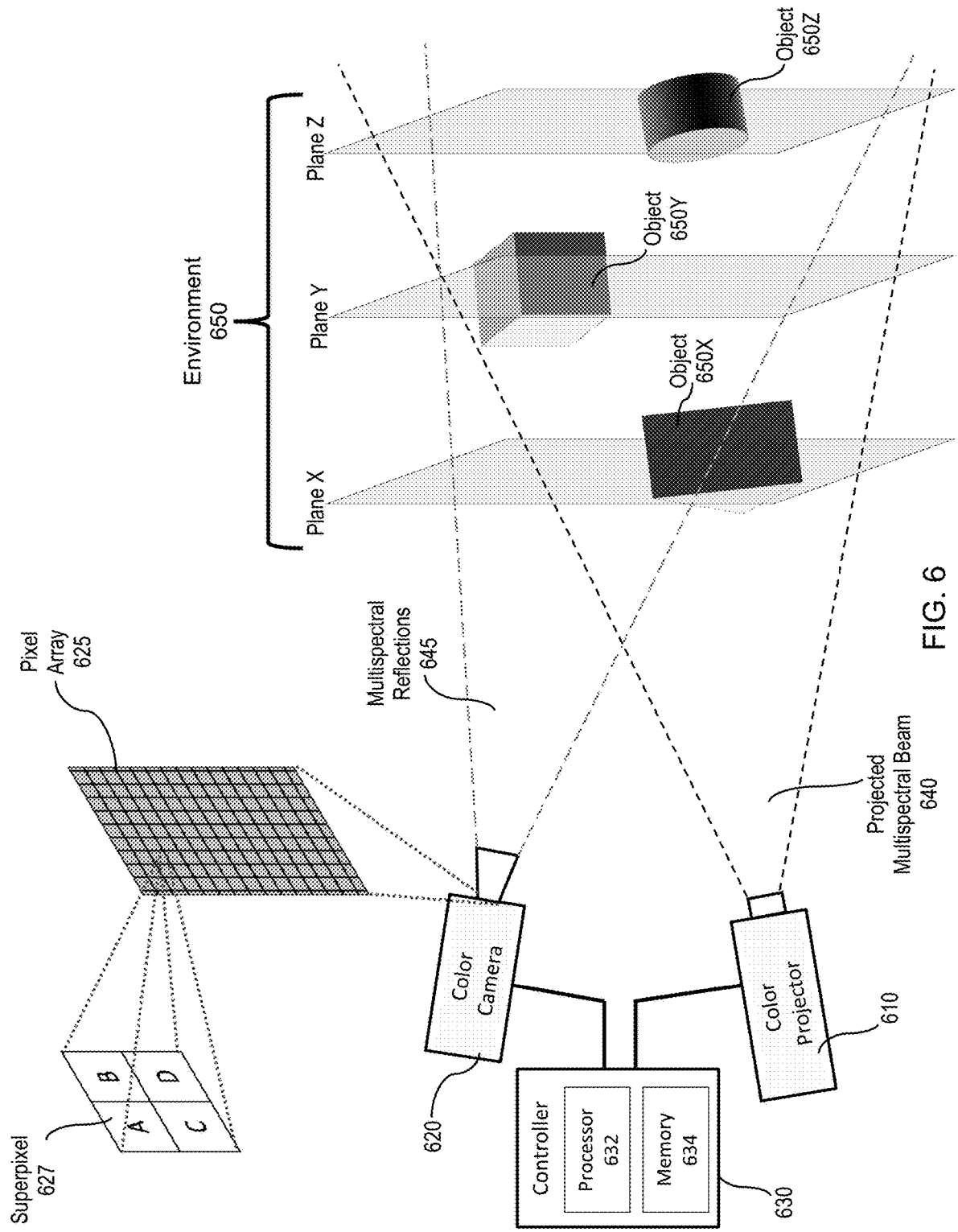
FIG. 6 illustrates a block diagram of a profilometric imaging system with a camera using spectral superpixels, according to an example.

FIG. 6 illustrates a block diagram of a profilometric imaging system with a camera using spectral superpixels, according to an example. As shown in FIG. 6, the profilometric imaging system according to an example may include a color projector 610, a color camera 620, and a controller 630. As shown in FIG. 6, the controller 630 in FIG. 6 controls the color projector 610 to project a multispectral beam 640, which carries multiscale pattern(s), onto the environment 650; the color camera 620 receives reflection(s) 645 of the projected multiscale pattern(s) from the environment 650; and the controller 630 receives and processes light data from the color camera 620 in order to perform profilometry.

In some examples, the color projector 610 projects a multispectral beam 640 including multiscale patterns optimized for different depths (i.e., distances from the profilometric imaging system), where different multiscale patterns are transmitted on different spectrum channels. In some examples, each multiscale pattern corresponds to a single spectrum channel, and/or a time series of multiscale patterns corresponds to a single spectrum channel.

In some examples, the different multiscale patterns on different spectrum channels may be projected simultaneously; in some examples, the different multiscale patterns on different spectrum channels may be projected in a time series; in other examples, the different multiscale patterns on different spectrum channels may be projected simultaneously and/or serially (e.g., spectral bands may be grouped together, where each spectral band may be projected simultaneously, and the spectral bands are projected in a time series).

In some examples, the color projector 610 may project in the ultraviolet spectrum (e.g., about 200-350 nm), the visual light spectrum (e.g., about 350 nm-750 nm), the infrared spectrum (e.g., about 750 nm-1000 nm), and/or any electromagnetic radiation spectrum capable of projecting multiscale patterns on a target object/environment such that the reflections of the multiscale patterns may be received and recorded by a camera in accordance with the present disclosure. In some examples, the color projector 610 projects several multiscale pattern(s) simultaneously in the infrared (IR) spectrum, where each multiscale pattern may be projected in a different corresponding infrared (IR) channel.

In some examples, the color camera 620 may receive reflected multiscale pattern(s) in the ultraviolet spectrum (e.g., about 200-350 nm), the visual light spectrum (e.g., about 350 nm-750 nm), the infrared spectrum (e.g., about 750 nm-1000 nm), and/or in any electromagnetic radiation spectrum capable of projecting multiscale patterns on a target object/environment such that the reflections of the multiscale patterns may be received and recorded by the color camera 620 in accordance with the present disclosure. In some examples, the color camera 620 may receive several multiscale pattern(s) projected simultaneously in the infrared (IR) spectrum, where each multiscale pattern may be in a different corresponding infrared (IR) channel.

In some examples, the color camera 620 may include a pixel array 625 consisting of a grid of superpixels, such as, e.g., a superpixel 627. In some examples, the pixel array 625 may include electronic image sensors, such as semiconductor chip-based sensors, including, e.g., charge coupled devices (CCDs) and active pixel sensors, most commonly fabricated with metal-oxide semiconductor (MOS) technology. In some examples, the pixel array 625 may consist solely of superpixels; in other examples, the pixel array 625 may consist of a mix of superpixels and regular pixels.

In some examples, the superpixel 627 includes a grid array of sub-pixels, such as, e.g., sub-pixels A, B, C, and D shown in FIG. 6, which may be sensitive to different spectral bands. In some examples, the different spectral bands to which the different sub-pixels are sensitive may overlap, or each cover its own unique spectrum, or each center on a different unique wavelength, or any combination thereof. In some examples, the different sub-pixels in the superpixel 627 may be utilized to select different multiscale patterns and/or different combinations of multiscale patterns.

In some examples, sub-pixels A and D may be sensitive to 850 nm and 950 nm light, sub-pixel B may be sensitive to only 850 nm light, and sub-pixel C may be sensitive to only 950 nm light. In such examples, the color projector 610 may project a finely textured multiscale pattern in an 850 nm channel and a coarsely textured multiscale pattern in a 950 nm channel. In such examples, selective imaging may be performed by the color camera 620 utilizing only one, some, or all of the sub-pixels in the superpixel 627 or by the controller 630 separating out and/or analyzing data from only one, some, or all of the sub-pixels in the superpixel 627.

In some examples, the color projector 610 may simultaneously project multiscale patterns optimized for different depths (i.e., distances from the profilometric imaging system) in different spectrum channels, while the color camera 620 may simultaneously receive the reflected multiscale patterns and provide the controller 630 with image data based on the received reflections. The controller 630 may perform an initial assessment based on this image data, thereby determining which spectrum channels provide the most accurate information on a target of interest. Based on this initial assessment, the controller 630 may perform further imaging by having the color projector 610 only project the multispectral beam 645 in one or more specific spectrum channels and/or by having data collected only by one or two of the sub-pixels in the superpixel 627. In this manner, both computational power and bandwidth may be more efficiently utilized.

The operational parameter to be dynamically adjusted in examples in accordance with the present disclosure may be at least one parameter or setting of the color camera 620 or both the color camera 620 and the projector 610. For instance, using the examples detailed above, the operational parameter may be, e.g., which or how many sub-pixel(s) to be employed in a superpixel, what spectral band/channel to use for imaging, how data from one or more sub-pixels may be digital signal processed to focus on a target of interest, etc., as would be understood by one of ordinary skill in the art.

Figure 7:
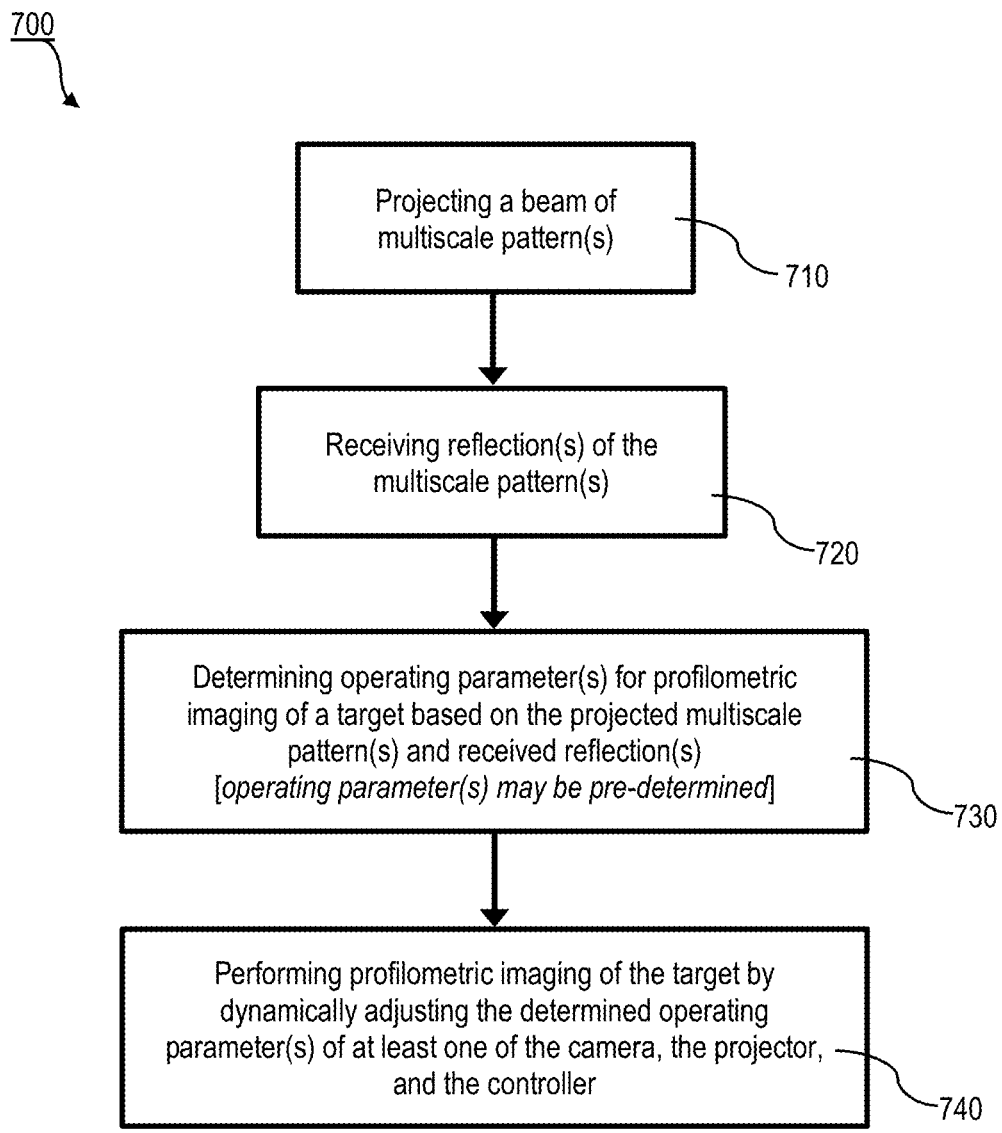
FIG. 7 illustrates a flow diagram for a profilometric imaging method, according to some examples.

FIG. 7 illustrates a flow diagram for a profilometric method, according to some examples. The method 700 shown in FIG. 7 is provided by way of example and may only be one part of the entire imaging process. The method 700 may further omit parts of the imaging process not germane to the present disclosure, as would be understood by one of ordinary skill in the art. Each block shown in FIG. 7 may further represent one or more steps, processes, methods, or subroutines, as would be understood by one of ordinary skill in the art. For the sake of convenience and ease of explanation, the blocks in FIG. 7 refer to the components of the profilometric imaging system shown in FIG. 1.

At block 710, the projector 110 may project a beam including multiscale pattern(s) onto the environment 150. The projected multiscale pattern(s) may be an array or multitude of multiscale patterns, or a series of multiscale patterns, which may be projected in a time series or simultaneously. The projected multiscale pattern(s) may illuminate and thereby reflect back from the surfaces of, for example, the objects 150A and 150C in the environment 150.

At block 720, the image sensor 120 may receive the reflection(s) of the multiscale pattern(s) projected on the objects 150A and 150C in the environment 150. The image sensor 120 may send image data to the controller 130 based on the received reflection(s).

At block 730, the controller 130 may determine an operational parameter(s) for the profilometric imaging of a target of interest based on the projected multiscale pattern(s) and the image data received from the image sensor 120 based on the reflections from the multiscale pattern(s) projected on the environment 150. For instance, the controller 130 may determine the operational parameter(s) for the profilometric imaging of the object 150C in plane C, based on the multiscale pattern(s) projected on the objects 150A and 150C in the environment 150. The operational parameter may be for any one of, or combination of, the projector 110, the imaging sensor 120, and the controller 130, as explained in detail above.

In some examples, the determination in block 730 may be part of an initial evaluation, where the profilometric imaging system afterwards performs blocks 710 and 720 again as part of block 740, using the determined operational parameter(s) from block 730. In some examples, the determination in block 730 may be part of a continuous process, where all of the blocks in FIG. 7 are being performed substantially simultaneously, examples of which will be explained more fully below. In some examples, the determination in block 730, or at least part of the determination in block 730, may have been performed before any imaging, or any of blocks 710, 720, and/or 740 were performed, such as in an example where pre-determined/pre-optimized multiscale pattern(s) are used.

At block 740, the controller 130 may perform profilometric imaging of the target of interest by dynamically adjusting the determined operational parameter(s) for at least one of the projector 110, the image sensor 120, and the controller 130 based on the determined optimal parameter(s). In some examples, one or more blocks in FIG. 7 may be performed in parallel (e.g., substantially simultaneously), in a different order, or in a repetitive or recursive manner. In some examples, one or more blocks, or parts of one or more blocks, in FIG. 7 may be performed before any imaging is performed by the profilometric imaging system, such as, e.g., in examples where pre-optimized multiscale pattern(s) are employed. In some examples, as discussed more fully below, block 730 may comprise an initial evaluation based on initial data and the profilometric imaging in block 740 may further comprise re-performing block 710 (projecting) and block 720 (receiving reflections) in order to perform the final evaluation in block 740.

As referred to above, all of the blocks in FIG. 7 may be performed substantially simultaneously. For instance, in the example of FIG. 3, the timing or intensity of the pulsing (the operational parameter) of the projector 310 may be dynamically varied and adjusted (block 740) as it projects beam 340 (block 710), and the camera 320 may be receiving reflection(s) (block 720) and the controller 330 may be performing ongoing/continuous/continual profilometry imaging (block 740) and may also be determining the optimal timing and/or intensity (block 730). For instance, in the example of FIG. 5, the mechanical/scanning parameters of the dynamic projector 510 may be continuously varied and adjusted (block 740) as it projects beam 540 (block 710), and while the camera 520 may be receiving reflection(s) (block 720) and the controller 530 may be performing ongoing/continuous/continual profilometry imaging (block 740) and may also be determining the optimal values for the mechanical scanning parameters on an ongoing basis (block 730). For instance, in the example of FIG. 6, the parameters of the sub-pixels receiving reflections in the color camera 620 (block 720) and/or the parameters of the spectral channels projected by the color projector 610 (block 710) may be continuously varied and adjusted (block 740) while the controller 630 may be performing ongoing/continuous/continual profilometry imaging (block 740) and may also be determining the optimal values for the sub-pixel and/or spectral channel parameters on an ongoing basis (block 730).

As referred to above, the determination in block 730 may be part of an initial evaluation, where blocks 710 and 720 may be repeated. For instance, in an example of FIG. 4A, the profilometric imaging system may first project a fractal series of multiscale patterns (block 710), receive the reflections (block 720), and perform some initial analysis, or even partial or full-fledged profilometry imaging, to determine which pattern(s) in the fractal series is most suitable for imaging a target of interest (block 730). Then, in some examples, blocks 710 and 720 are performed again using only the determined pattern(s), and the profilometric imaging is performed using an imaging data set based only on the determined pattern(s) (block 740). In other examples, blocks 710 and 720 are not performed again, but rather the controller 430 narrow downs the imaging data set to focus on the most informative data based on the determined pattern(s) in block 740.

For instance, in the example of FIG. 5, the profilometric imaging system may first project a multiscale pattern(s) (block 710) while continuously varying the parameter(s) of the dynamic projector 510, receive the reflections (block 720), and perform some initial analysis, or even partial or full-fledged profilometry imaging, to determine what value(s) of the parameter(s) is most suitable for imaging a target of interest (block 730). Then, in some examples, blocks 710 and 720 are performed again using only the determined value(s) of the parameters of the dynamic projector 510 from block 730, and the profilometric imaging is performed using an imaging data set based only on the determined value(s) of the parameters of the dynamic projector 510 (block 740).

For instance, in the example of FIG. 6, the profilometric imaging system may project a multiscale pattern(s) while continuously varying the parameters of the sub-pixels receiving reflections in the color camera 620 (block 720) and/or the parameters of the spectral channels projected by the color projector 610 (block 710), and perform some initial analysis, or even partial or full-fledged profilometry imaging, to determine what value(s) of the varied parameter(s) is most suitable for imaging a target of interest (block 730). Then, in some examples, blocks 710 and 720 are performed again using only the value(s) determined in block 730 of the parameters of the color projector 610 and/or the color camera 620, and the profilometric imaging is performed using an imaging data set based on using only the determined value(s) of the parameters of the color projector 610 and/or the color camera 620 (block 740).

As referred to above, one or more blocks, or parts of one or more blocks, in FIG. 7 may be performed before any imaging is performed by the profilometric imaging system, such as, e.g., examples where pre-optimized multiscale pattern(s) are employed. In some examples, a plurality and/or series of pre-determined, i.e., pre-optimized, multiscale patterns may be employed, where each pattern in the plurality/series of multiscale patterns may be optimized for specific environmental parameters, such as, for example, depth (i.e., distance from the profilometric imaging system), ambient lighting, the nature of the target of interest and/or its specific surface features, etc. In such examples, an initial evaluation may be performed to determine the optimal pre-optimized pattern(s) for the target of interest (i.e., performing blocks 710, 720, and 730) and then imaging performed using the determined pre-optimized pattern(s) (i.e., re-performing blocks 710 and 720, and then performing block 740). In such examples, a plurality or all of the series of multiscale patterns may be projected in sequence and/or simultaneously in the initial evaluation.

In some examples, an optimal pre-determined/pre-optimized pattern(s) for the target of interest from the plurality/series of pre-determined/pre-optimized pattern(s) may be determined in block 730 via other means, e.g., a distance sensor determining the distance to the target and the pre-determined/pre-optimized pattern(s) being selected based on the determined distance. In such examples, the profilometric imaging system may perform block 730 first and then the blocks 710 (projecting) and 720 (receiving reflection(s)) as part of performing block 740, where the dynamic adjustment of an operating parameter may be considered to be the selection of the appropriate pre-determined/pre-optimized pattern(s) e plurality/series of pre-determined/pre-optimized multiscale patterns.

According to examples, a method of profilometric imaging is described herein. A system for profilometric imaging and devices for profilometric imaging are also described herein. A non-transitory computer-readable storage medium may have an executable stored thereon, which when executed instructs a processor to perform the methods described herein.

In the foregoing description, various examples are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples.

The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example' is not necessarily to be construed as preferred or advantageous over other embodiments or designs.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

The invention claimed is:

1. A system, comprising:
a projector to project a beam comprising a plurality of multiscale patterns on a plurality of spectral channels;
an image sensor comprising a pixel array to receive reflections of the projected plurality of multiscale patterns, the pixel array comprising at least one superpixel, wherein the at least one superpixel comprises a plurality of sub-pixels, and the plurality of sub-pixels comprises:
a first sub-pixel sensitive to a first spectral band, and
a second sub-pixel sensitive to a second spectral band; and
a controller, communicatively coupled to the projector and the image sensor, the controller to perform profilometric imaging of a target object by dynamically adjusting at least one operational parameter of the image sensor, the projector, or the controller.

2. The system of claim 1, wherein the controller is further to determine at least one of the at least one operating parameter or a value of the at least one operating parameter.

3. The system of claim 2, wherein the controller is further to perform an initial evaluation of at least one of the target object or an environment of the target object to determine the at least one of the at least one operating parameter or a value of the at least one operating parameter.

4. The system of claim 1, wherein
the projector is to project the beam by pulsing the projected beam,
the at least one operational parameter is a timing of the pulsing of the projector, and
the timing of the pulsing is dynamically adjusted to perform the profilometric imaging of the target object.

5. The system of claim 4, wherein:
the plurality of multiscale patterns comprises at least one speckle pattern, and
the timing of the pulsing is dynamically adjusted thereby changing a resolution of the at least one speckle pattern.

6. The system of claim 1, wherein the plurality of multiscale patterns comprises at least one of a fractal multiscale pattern or a plurality of fractal multiscale patterns.

7. The system of claim 6, wherein the plurality of fractal multiscale patterns is a fractal series of multiscale patterns.

8. The system of claim 1, wherein
the projector comprises at least one mechanical component and at least one electronic component, and
the at least one operational parameter comprises a parameter of the at least one mechanical component.

9. The system of claim 8, wherein the projector comprises at least one of a micro-electromechanical system (MEMS), a micro-optoelectronic system (MOEMS), a spatial light modulator, a deformable mirror, a galvanometric scanner, or an acousto-optic scanner.

10. A method for profilometric imaging, comprising:
projecting, by a color projector, a beam comprising a plurality of multiscale patterns;
receiving, by a color camera, reflections of the projected plurality of multiscale patterns, wherein the color camera comprises a pixel array comprising at least one superpixel, the at least one superpixel comprises a plurality of sub-pixels, wherein the plurality of sub-pixels comprises:
first sub-pixel sensitive to a first spectral band, and
a second sub-pixel sensitive to a second spectral band; and
performing profilometric imaging of a target object by dynamically adjusting at least one operating parameter of a profilometric imaging device, based at least on the projected plurality of multiscale patterns and the received reflections.

11. The method for profilometric imaging of claim 10, further comprising:
determining the at least one operating parameter.

12. The method for profilometric imaging of claim 10, further comprising:
pulsing the projected beam; and
performing the profilometric imaging of the target object by dynamically adjusting a timing of the pulsing.

13. The method of profilometric imaging of claim 10, wherein the projected plurality of multiscale patterns comprises a fractal series of multiscale patterns, further comprising:
determining at least one multiscale pattern in the fractal series of multiscale patterns to provide three-dimensional (3D) information regarding the target object,
wherein the profilometric imaging of the target object is performed by dynamically adjusting to project only the determined at least one multiscale pattern.

14. The method of profilometric imaging of claim 10, wherein the color projector comprises at least one mechanical component and at least one electronic component, and wherein the profilometric imaging of the target object is performed by dynamically adjusting the at least one parameter of the at least one mechanical component of the color projector.

15. A near-eye display device, comprising:
a display; and
a profilometric imaging system comprising:
a color projector to project a beam comprising a plurality of multiscale patterns; and
a color image sensor to receive reflections of the projected plurality of multiscale patterns, wherein the color image sensor comprises a pixel array comprising at least one superpixel, the at least one superpixel comprises a plurality of sub-pixels, wherein the plurality of sub-pixels comprises:
first sub-pixel sensitive to a first spectral band, and
a second sub-pixel sensitive to a second spectral band; and
a controller to perform profilometric imaging of a target object by dynamically adjusting at least one operating parameter of the profilometric imaging system, based at least on the projected plurality of multiscale patterns and the received reflections.

16. The near-eye display device of claim 15, wherein the color projector and the color image sensor are inward-facing.

17. The near-eye display device of claim 15, wherein the color projector and the color image sensor are outward-facing.

18. The near-eye display device of claim 15, wherein the controller is further to determine at least one of the at least one operating parameter or a value of the at least one operating parameter.

19. The near-eye display device of claim 18, wherein the controller is further to perform an initial evaluation of at least one of the target object or an environment of the target object to determine the at least one of the at least one operating parameter or a value of the at least one operating parameter.

20. The method for profilometric imaging of claim 10, further comprising:
determining at least one of the at least one operating parameter or a value of the at least one operating parameter.

* * * * *